United States Patent
Kotra et al.

(10) Patent No.: US 12,184,842 B2
(45) Date of Patent: *Dec. 31, 2024

(54) LUMA INTRA MODE SIGNALING

(71) Applicant: Huawei Technologies Co., Ltd., Shenzhen (CN)

(72) Inventors: Anand Meher Kotra, Munich (DE); Jianle Chen, San Diego, CA (US); Semih Esenlik, Munich (DE); Zhijie Zhao, Munich (DE); Han Gao, Munich (DE); Biao Wang, Munich (DE); Ivan Krasnov, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,404

(22) Filed: May 23, 2023

(65) Prior Publication Data

US 2023/0370587 A1 Nov. 16, 2023

Related U.S. Application Data

(63) Continuation of application No. 17/518,254, filed on Nov. 3, 2021, now Pat. No. 11,695,927, which is a (Continued)

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS 9,565,455 B2 * 2/2017 Seregin ................ H04N 19/157
9,769,472 B2 9/2017 Liu et al.
(Continued)

FOREIGN PATENT DOCUMENTS

CA 2838578 A1 7/2013
JP 2019530367 A 10/2019
(Continued)

OTHER PUBLICATIONS

Kotra, A., et al, "CE3 3.2.2: Intra mode signaling with priority based MPM and non-MPM list construction," JVET-K0365, Joint Video Experts Team (JVET) of ITU-T SG 16 WP 3 and ISO/IEC JTC 1/SC 29/WG11, 11th Meeting: Ljubljana, SI, Jul. 10-18, 2018, 6 pages, XP030198932.

(Continued)

*Primary Examiner* — Chikaodili E Anyikire
(74) *Attorney, Agent, or Firm* — Conley Rose, P.C.

(57) ABSTRACT

A coding apparatus configured to select an intra prediction mode for a current block, encode the selected intra prediction mode using truncated binary coding every time the selected intra prediction mode is a remaining mode, and encode the selected intra prediction mode using N bits when the selected intra prediction mode is included in a first portion from remaining modes and using N+1 bits when the selected intra prediction mode is included in a second portion of the remaining modes.

8 Claims, 4 Drawing Sheets

Related U.S. Application Data continuation of application No. 16/899,313, filed on Jun. 11, 2020, now Pat. No. 11,196,991, which is a continuation of application No. PCT/US2019/031347, filed on May 8, 2019.

(60) Provisional application No. 62/696,739, filed on Jul. 11, 2018.

(51) Int. Cl.
*H04N 19/132* (2014.01)
*H04N 19/159* (2014.01)
*H04N 19/176* (2014.01)

(56) References Cited

U.S. PATENT DOCUMENTS

| | | | |
|---|---|---|---|
| 10,863,172 | B2 | 12/2020 | Yu et al. |
| 2014/0140404 | A1* | 5/2014 | Liu .................. H04N 19/70 375/240.12 |
| 2015/0296221 | A1 | 10/2015 | Yang et al. |
| 2017/0272745 | A1* | 9/2017 | Liu .................. H04N 19/157 |
| 2018/0063553 | A1 | 3/2018 | Zhang et al. |
| 2018/0098064 | A1 | 4/2018 | Seregin et al. |
| 2019/0387222 | A1 | 12/2019 | Kim et al. |
| 2020/0195920 | A1 | 6/2020 | Racape et al. |
| 2020/0236351 | A1 | 7/2020 | Kotra et al. |
| 2020/0343068 | A1 | 10/2020 | Pan et al. |

FOREIGN PATENT DOCUMENTS

| | | |
|---|---|---|
| JP | 2021500732 A | 1/2021 |
| WO | 2017086746 A1 | 5/2017 |
| WO | 2018035130 A1 | 2/2018 |
| WO | 2018064956 A1 | 4/2018 |

OTHER PUBLICATIONS

Akula, S., et al., "Description of SDR, HDR and 360 video coding technology proposal considering mobile application scenario by Samsung, Huawei, GoPro, and HiSillcon," JVET-J0024 v2, buJoint Video Exploration Team(JVET) of ITU-T SG 16 WP 3 and ISO/IEC JTC 1/SC 29/WG11, 10th Meeting: San Diego, US., Apr. 10-20, 2018, 124 pages, XP030248222.

Wang, B., et al., "CE3 6.3.2: Intra mode coding with 6 MPM and remapping strategy for non-MPM ikipedia," JVET-L0220, Joint Video Experts Team (JVET) of ITU-T SG 16 WP 3 and ISO/IEC JTC 1/SC29/WG11, 12th Meeting: Macau SAR, CN, Oct. 3-12, 2018, 4 pages, XP030193766.

Anonymous: "Truncated binary encoding—Wikipedia", XP055805740, Retrieved from the Internet: URL:https://en.wikipedia.org/w/index.php? title= Truncated_binary_encodingandoldid=830072246, Mar. 12, 2018, 4 pages.

Document: JVET-J0021, Chen, Y., et al., "Description of SDR, HDR and 360° video coding technology proposal by Qualcomm and Technicolor—low and high complexity versions," Joint Video Exploration Team (JVET) of ITU-T SG 16 WP 3 and ISO/IEC JTC 1/SC 29/WG 11 10th Meeting: San Diego, US, Internet URL: http://phenix.it-sudparis.eu/jvet/doc_end_user/documents/ 10_San%20Diego/wg11/JVET-J0021-v5.zip>, Apr. 14, 2018, pp. 43 pages.\.

"Series H: Audiovisual and Multimedia Systems Infrastructure of audiovisual services—Transmission multiplexing and synchronization Multiplexing protocol for low bit rate multimedia communication," ITU-T Recommendation H.223, Jul. 2001, 74 pages.

"Series H: Audiovisual and Multimedia Systems Infrastructure of audiovisual services—Coding of moving video; Video coding for low bit rate communication," ITU-T Recommendation H.263, Jan. 2005, 226 pages.

"Series H: Audiovisual and Multimedia Systems Infrastructure of audiovisual services—Coding of moving video Advanced video coding for generic audiovisual services," Recommendation ITU-T H.264, Jun. 2019, 836 pages.

"Series H: Audiovisual and Multimedia Systems Infrastructure of audiovisual services Coding of moving video High efficiency video coding," Recommendation ITU-T H.265, Apr. 2013, 317 pages.

Anand Meher Kotra et al., "CE3 3.2.2: Intra mode signaling with priority based MPM and non-MPM list construction," Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0365, 5 pages Yao Wang, "Image and Video Processing, Binary encoding and Quantization," Tandon School of Engineering, NewYork University, EL-GY 6123: Image and video Processing, Pub Date: Nov. 4, 2016, 79 pages.

* cited by examiner

LUMA INTRA MODE SIGNALING

CROSS-REFERENCE TO RELATED APPLICATIONS

This application is a continuation of co-pending U.S. patent application Ser. No. 17/518,254, filed Nov. 3, 2021, which is a continuation of co-pending U.S. patent application Ser. No. 16/899,313, filed Jun. 11, 2020, which is a continuation of International Application No. PCT/US2019/031347 filed on May 8, 2019, which claims the benefit of U.S. Provisional Patent Application No. 62/696,739, filed Jul. 11, 2018, each of which is hereby incorporated by reference.

TECHNICAL FIELD

The present disclosure is generally related to video coding, and is specifically related to luma intra mode signaling.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of coding implemented by a coding apparatus. The method includes selecting, using the coding apparatus, an intra prediction mode for a current block; and encoding, using the coding apparatus, the selected intra prediction mode using truncated binary coding when the selected intra prediction mode is a remaining mode. In an embodiment, the method includes determining that the intra prediction mode that was selected is within the remaining modes list.

As will be more fully explained below, the method improves the existing intra mode signaling scheme. Embodiments may be configured to code all remaining intra modes, e.g., all intra modes that are not in the MPM-list (a.k.a., "non-MPM modes") and are signaled in the bitstream, using truncated binarization. By using truncated binarization for the remaining modes, codewords are used more efficiently.

In a first implementation form of the method according to the first aspect as such, the method further comprises determining that the selected intra prediction mode falls outside a most probable modes (MPM) list.

In a second implementation form of the method according to the first aspect as such or any preceding implementation form of the first aspect, the method further comprises encoding the selected intra prediction mode using 5 bits when the selected intra prediction mode is one of a first three modes from remaining modes.

In a third implementation form of the method according to the first aspect as such or any preceding implementation form of the first aspect, the method further comprises encoding the selected intra prediction mode using N bits when the selected intra prediction mode is included in a first portion from remaining modes and using N+1 bits when the selected intra prediction mode is included in a second portion of the remaining modes.

In a fourth implementation form of the method according to the first aspect as such or any preceding implementation form of the first aspect, the method further comprises encoding the intra prediction mode using 6 bits when the selected intra prediction mode is not one of a first three modes from remaining modes.

In a fifth implementation form of the method according to the first aspect as such or any preceding implementation form of the first aspect, the remaining mode is one of 61 remaining modes.

In a sixth implementation form of the method according to the first aspect as such or any preceding implementation form of the first aspect, the MPM list contains 6 modes and the remaining mode is one of 61 remaining modes.

In a seventh implementation form of the method according to the first aspect as such or any preceding implementation form of the first aspect, all modes either belong to the MPM list or to the remaining modes.

In an eighth implementation form of the method according to the first aspect as such or any preceding implementation form of the first aspect, all of the remaining modes are coded using the truncated binary coding.

In a ninth implementation form of the method according to the first aspect as such or any preceding implementation form of the first aspect, the method further comprises filling initial modes in a remaining modes list using a predetermined default mode list.

In a tenth implementation form of the method according to the first aspect as such or any preceding implementation form of the first aspect, the predetermined default mode list comprises a planar mode (PLANAR_IDX), a dc mode (DC_IDX), a vertical mode (VER_IDX), a horizontal mode (HOR_IDX), an intra mode 2 (2), a vertical diagonal mode (VDIA_IDX), and a diagonal mode (DIA_IDX).

In an eleventh implementation form of the method according to the first aspect as such or any preceding implementation form of the first aspect, the method further comprises filling initial modes in the remaining modes list using an offset to angular modes included in the MPM list.

In a twelfth implementation form of the method according to the first aspect as such or any preceding implementation form of the first aspect, the offset is +/−N, where N is an integer with a value of 1, 2, 3, or 4.

In a thirteenth implementation form of the method according to the first aspect as such or any preceding implementation form of the first aspect, the offset is added only to a first of two of the angular modes in the MPM list.

In a fourteenth implementation form of the method according to the first aspect as such or any preceding implementation form of the first aspect, the method further comprises filling initial modes of a remaining mode list using modes of neighboring blocks not immediately adjacent to the current block.

In a fifteenth implementation form of the method according to the first aspect as such or any preceding implementation form of the first aspect, the method further comprises filling initial modes of a remaining modes list using modes of second tier neighbors of the current block instead of first tier neighbors.

In a sixteenth implementation form of the method according to the first aspect as such or any preceding implementation form of the first aspect, the method further comprises filling initial modes in the remaining modes list based on a location of a majority of modes in the MPM list relative to one of a planar mode (PLANAR_IDX), a dc mode (DC_IDX), a vertical mode (VER_IDX), a horizontal mode (HOR_IDX), an intra mode 2 (2), a vertical diagonal mode (VDIA_IDX), and a diagonal mode (DIA_IDX).

In a seventeenth implementation form of the method according to the first aspect as such or any preceding implementation form of the first aspect, the method further comprises filling initial modes in the remaining modes list by: comparing each of the modes in the MPM list to a location of different modes within a default mode list; determining that a winning one of the different modes within the default mode list is nearest to a majority of the modes in the MPM list; and filling the first three modes in the remaining mode list with modes nearest to the winning one of the different modes within the default mode list.

A second aspect relates to method of decoding implemented by a decoding apparatus. The method includes obtaining, by the decoding apparatus, truncated binary code; decoding, by the decoding apparatus, the truncated binary code to obtain an intra prediction mode comprising a remaining mode; and generating, by the decoding apparatus, a current block using the intra prediction mode that was obtained.

As will be more fully explained below, the method improves the existing intra mode signaling scheme. Embodiments may be configured to decode the truncated binary code to obtain an intra prediction mode, which is one of the remaining modes encoded using truncated binary coding. By using truncated binarization for the remaining modes, codewords are used more efficiently.

In a first implementation form of the method according to the second aspect as such, the method further comprises determining that the intra prediction mode is outside a most probable modes (MPM) list.

In a second implementation form of the method according to the second aspect as such or any preceding implementation form of the second aspect, the method further comprises decoding the intra prediction mode using 5 bits when the intra prediction mode was one of a first three modes from remaining modes.

In a third implementation form of the method according to the second aspect as such or any preceding implementation form of the second aspect, the method further comprises decoding the intra prediction mode using 6 bits when the intra prediction mode is outside a first three modes from remaining modes.

In a fourth implementation form of the method according to the second aspect as such or any preceding implementation form of the second aspect, the remaining mode is one of 61 remaining modes.

In a fifth implementation form of the method according to the second aspect as such or any preceding implementation form of the second aspect, there are 6 modes in the MPM list and 61 modes in the remaining modes.

In a sixth implementation form of the method according to the second aspect as such or any preceding implementation form of the second aspect, all intra-prediction modes either belong to the MPM list or to the remaining modes.

In a seventh implementation form of the method according to the second aspect as such or any preceding implementation form of the second aspect, all of the remaining modes are coded using the truncated binary coding.

In an eighth implementation form of the method according to the second aspect as such or any preceding implementation form of the second aspect, initial modes in a remaining modes list are from a predetermined default mode list.

In a ninth implementation form of the method according to the second aspect as such or any preceding implementation form of the second aspect, the predetermined default mode list comprises a planar mode (PLANAR_IDX), a dc mode (DC_IDX), a vertical mode (VER_IDX), a horizontal mode (HOR_IDX), an intra mode 2 (2), a vertical diagonal mode (VDIA_IDX), and a diagonal mode (DIA_IDX).

In a tenth implementation form of the method according to the second aspect as such or any preceding implementation form of the second aspect, initial modes in the remaining modes list are based on an offset to angular modes included in the MPM list.

In an eleventh implementation form of the method according to the second aspect as such or any preceding implementation form of the second aspect, the offset is +/−N, where N is an integer with a value of 1, 2, 3, or 4.

In a twelfth implementation form of the method according to the second aspect as such or any preceding implementation form of the second aspect, the offset is added only to a first of two of the angular modes in the MPM list.

In a thirteenth implementation form of the method according to the second aspect as such or any preceding implementation form of the second aspect, initial modes in the remaining modes list are based on modes of neighboring blocks not immediately adjacent to the current block.

In a fourteenth implementation form of the method according to the second aspect as such or any preceding implementation form of the second aspect, initial modes in the remaining modes list are based on modes of second tier neighbors of the current block instead of first tier neighbors.

In a fifteenth implementation form of the method according to the second aspect as such or any preceding implementation form of the second aspect, initial modes in the remaining modes list are based on a location of a majority of modes in the MPM list relative to one of a planar mode (PLANAR_IDX), a dc mode (DC_IDX), a vertical mode (VER_IDX), a horizontal mode (HOR_IDX), an intra mode 2 (2), a vertical diagonal mode (VDIA_IDX), and a diagonal mode (DIA_IDX).

In a sixteenth implementation form of the method according to the second aspect as such or any preceding implementation form of the second aspect, initial modes in the remaining modes list were determined by: comparing each of the modes in the MPM list to a location of different modes within a default mode list; determining that a winning one of the different modes within the default mode list is nearest to a majority of the modes in the MPM list; and filling the first three modes in the remaining mode list with modes nearest to the winning one of the different modes within the default mode list.

In a seventeenth implementation form of the method according to the second aspect as such or any preceding implementation form of the second aspect, the different modes within the mode category comprise a planar mode (PLANAR_IDX), a dc mode (DC_IDX), a vertical mode (VER_IDX), a horizontal mode (HOR_IDX), an intra mode 2 (2), a vertical diagonal mode (VDIA_IDX), and a diagonal mode (DIA_IDX).

A third aspect relates to an encoding apparatus configured to perform any of the preceding encoding methods.

A fourth aspect relates to a decoding apparatus configured to perform any of the preceding decoding methods.

A fifth aspect relates to an encoding apparatus including a memory; and a processor coupled to the memory, the processor configured to: select an intra prediction mode for a current block; encode the selected intra prediction mode using truncated binary coding when the selected intra prediction mode is a remaining node.

In a first implementation form of the encoding apparatus according to the fifth aspect as such, the encoding apparatus comprises a transmitter coupled to the processor, the transmitter configured to transmit the encoded selected intra prediction mode toward a decoding apparatus.

In a second implementation form of the encoding apparatus according to the fifth aspect as such or any preceding implementation form of the fifth aspect, the processor is configured to implement one or more of the preceding aspects or implementations.

Further implementation forms of the encoding apparatus correspond to the respective implementation forms of the encoding method according to the first aspect.

A sixth aspect relates to a decoding apparatus including a receiver configured to obtain a truncated binary code; a processor coupled to the receiver, the processor configured to: decode the truncated binary code to obtain an intra prediction mode comprising a remaining mode; and generate a current block using the intra prediction mode that was obtained.

In a first implementation form of the decoding apparatus according to the sixth aspect as such, the decoding apparatus comprises a display coupled to the processor, the display configured to display an image generated using the current block.

In a second implementation form of the encoding apparatus according to the sixth aspect as such or any preceding implementation form of the sixth aspect, the processor is configured to implement one or more of the preceding aspects or implementations.

Further implementation forms of the decoding apparatus correspond to the respective implementation forms of the decoding method according to the second aspect.

For the purpose of clarity, any one of the foregoing embodiments may be combined with any one or more of the other foregoing embodiments to create a new embodiment within the scope of the present disclosure. Further details of embodiments are provided in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein.

Figure 1:
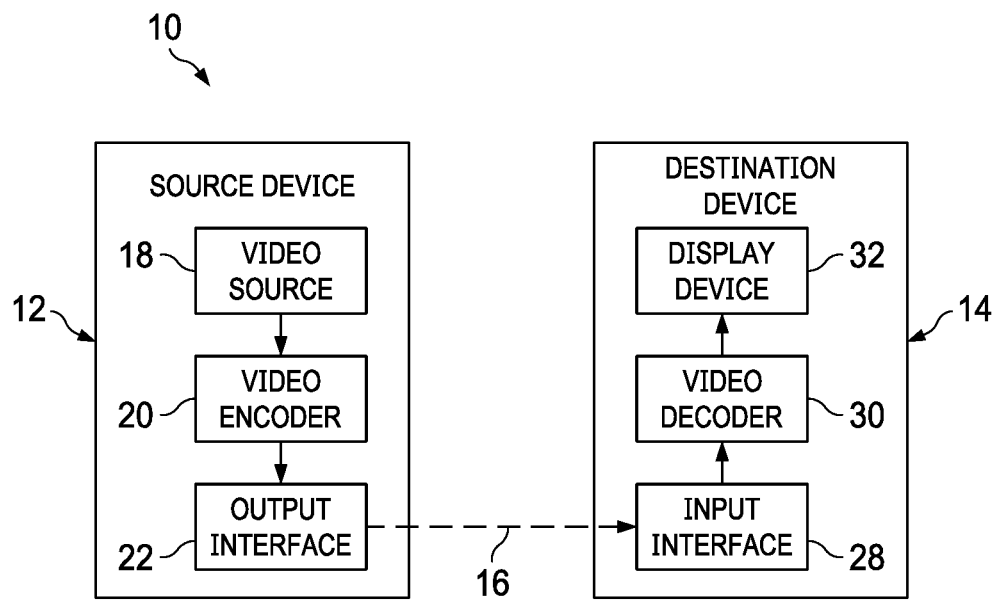
FIG. 1 is a block diagram illustrating an example coding system that may utilize context modeling techniques.

FIG. 1 is a block diagram illustrating an example coding system 10 that may be suitable for implementing various video coding, prediction or compression techniques. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 and/or the video decoder 30 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for bidirectional prediction may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
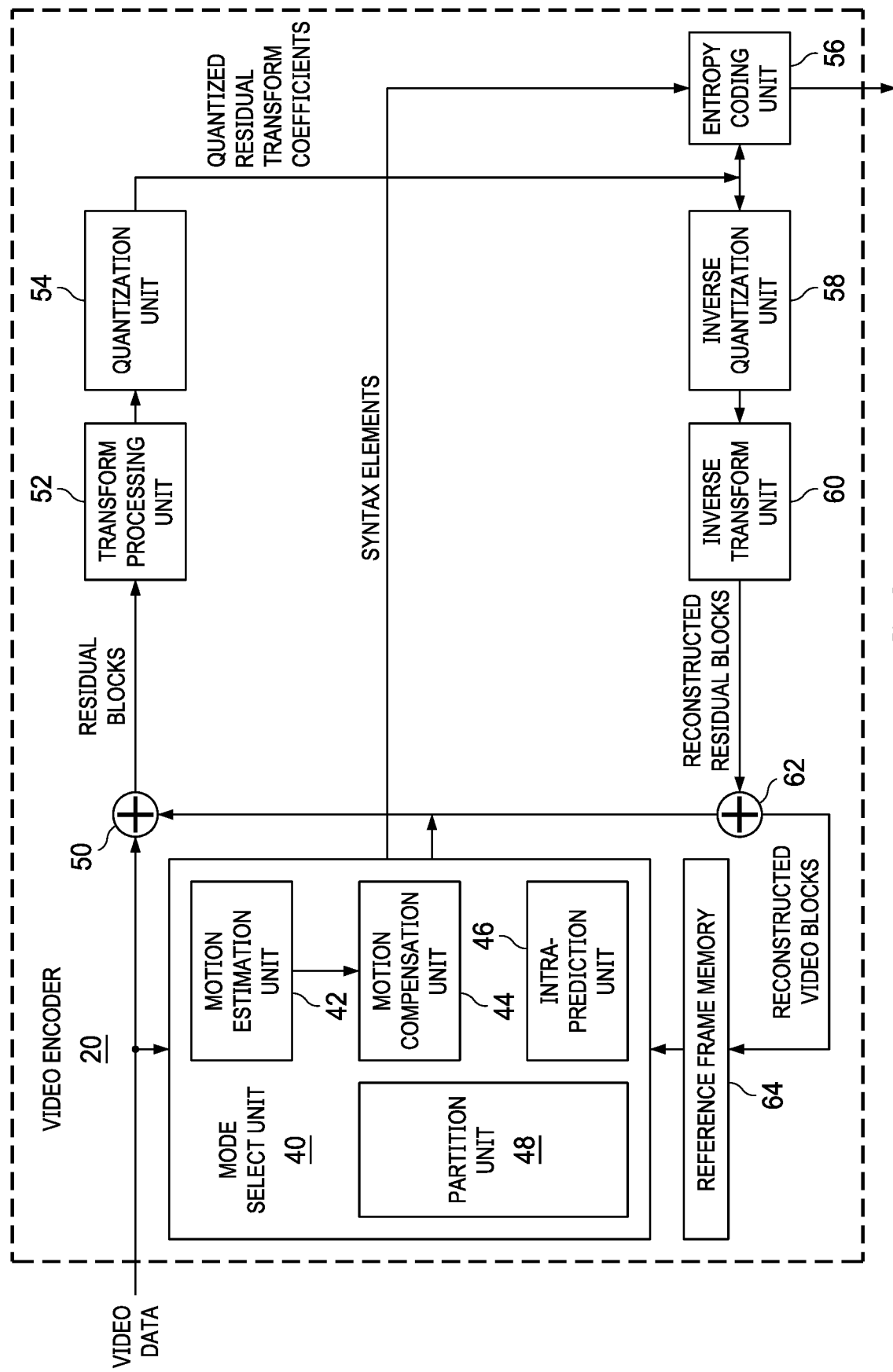
FIG. 2 a block diagram illustrating an example video encoder that may implement context modeling techniques.

FIG. 2 is a block diagram illustrating an example of video encoder 20 that may implement bidirectional prediction techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quadtree data structure indicative of partitioning of a LCU into sub-CUs. Leaf-node CUs of the quadtree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
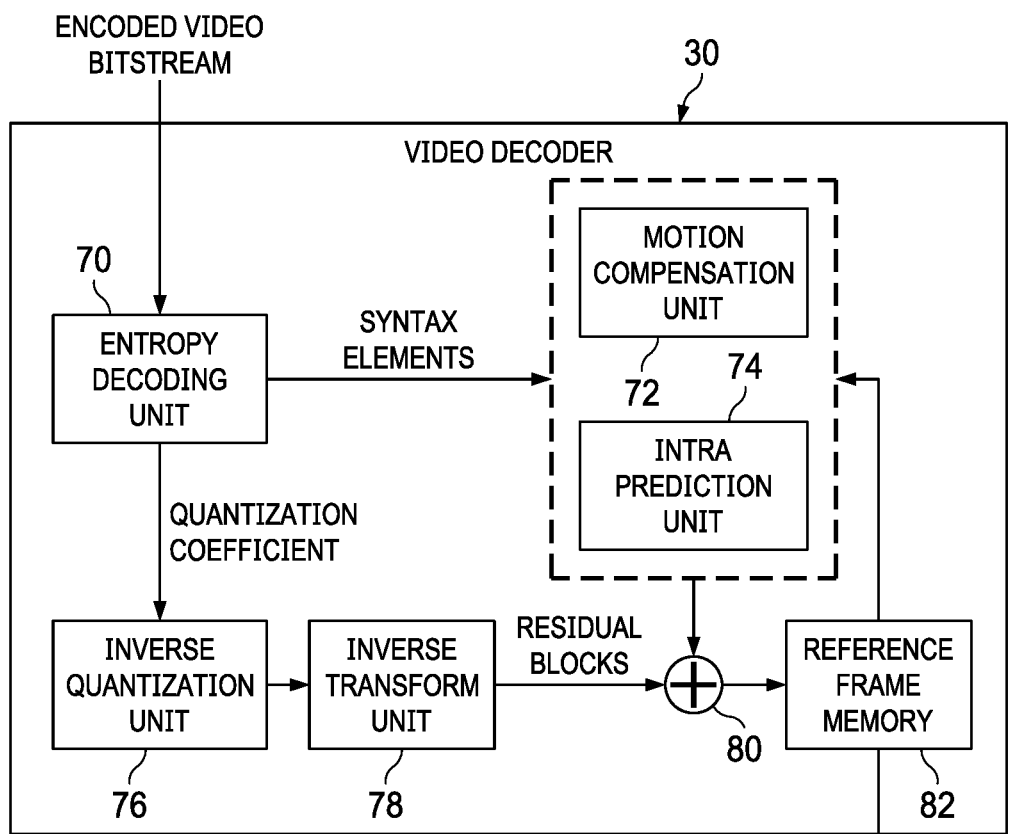
FIG. 3 a block diagram illustrating an example video decoder that may implement context modeling techniques.

FIG. 3 is a block diagram illustrating an example of video decoder 30 that may implement bidirectional prediction techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Although certain embodiments are described herein using the concept of slices, embodiments may use tiles and/or tile groups instead of or additional to slices.

Definitions of Acronyms & Glossary

CTU/CTB—Coding Tree Unit/Coding Tree Block
CU/CB—Coding Unit/Coding Block
PU/PB—Prediction Unit/Prediction Block
TU/TB—Transform Unit/Transform Block
HEVC—High Efficiency Video Coding Video coding schemes such as H.264/AVC and HEVC are designed along the successful principle of block-based hybrid video coding. Using this principle a picture is first partitioned into blocks and then each block is predicted by using intra-picture or inter-picture prediction.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The VTM (Versatile Test Model) standard uses 35 Intra modes whereas the BMS (Benchmark Set) uses 67 Intra modes. To code the 67 intra modes, the current intra mode coding scheme in BMS uses the following method.

To accommodate the increased number of directional Intra modes in BMS, an Intra mode coding method with 6 Most Probable Modes (MPMs) is used. Two major technical aspects are involved.

1) the derivation of 6 MPMs, and
2) entropy coding of 6 MPMs and non-MPM modes.

In BMS, the modes included into the MPM lists are classified into three groups: Neighbor intra modes, Derived intra modes, and Default intra modes.

Figure 4:
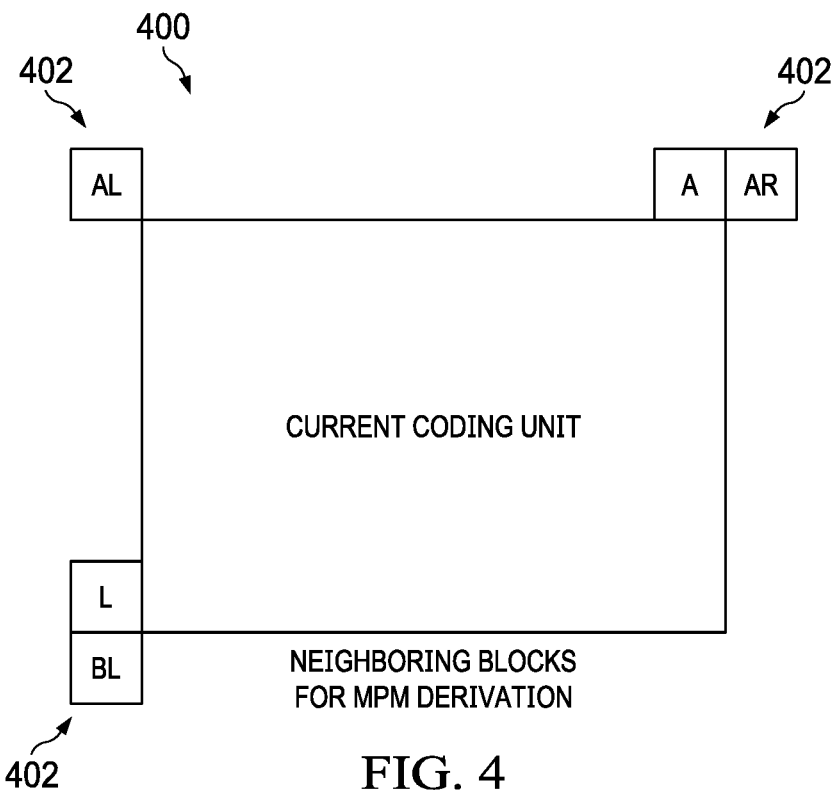
FIG. 4 is a schematic diagram of a current coding unit and five neighboring blocks.

FIG. 4 depicts a current coding unit 400 and five neighboring blocks 402. The current coding unit 400 may also be referred to as a current coding block. Five neighboring intra prediction modes, or in other words intra prediction modes of five neighboring blocks, are used to form the MPM list. Those locations of the 5 neighboring blocks are the same as those used in the merge mode, i.e., left (L), above (A), below left (BL), above right (AR), and above left (AL) as shown in FIG. 4. An initial MPM list is formed by inserting 5 neighbor intra modes, planar, and DC modes into the MPM list. A pruning process is used to remove the duplicated modes so that only unique modes are included into the MPM list. The order in which the initial modes are included is left, above, planar, DC, below left, above right, and above left.

If the MPM list is not full (i.e. has less than 6 MPM candidates in the list), derived modes are added, those intra modes are obtained by adding −1 or +1 to the angular modes which are already included in the MPM list. Derivation is not applied to non-angular modes, i.e. DC or planar.

Figure 6:
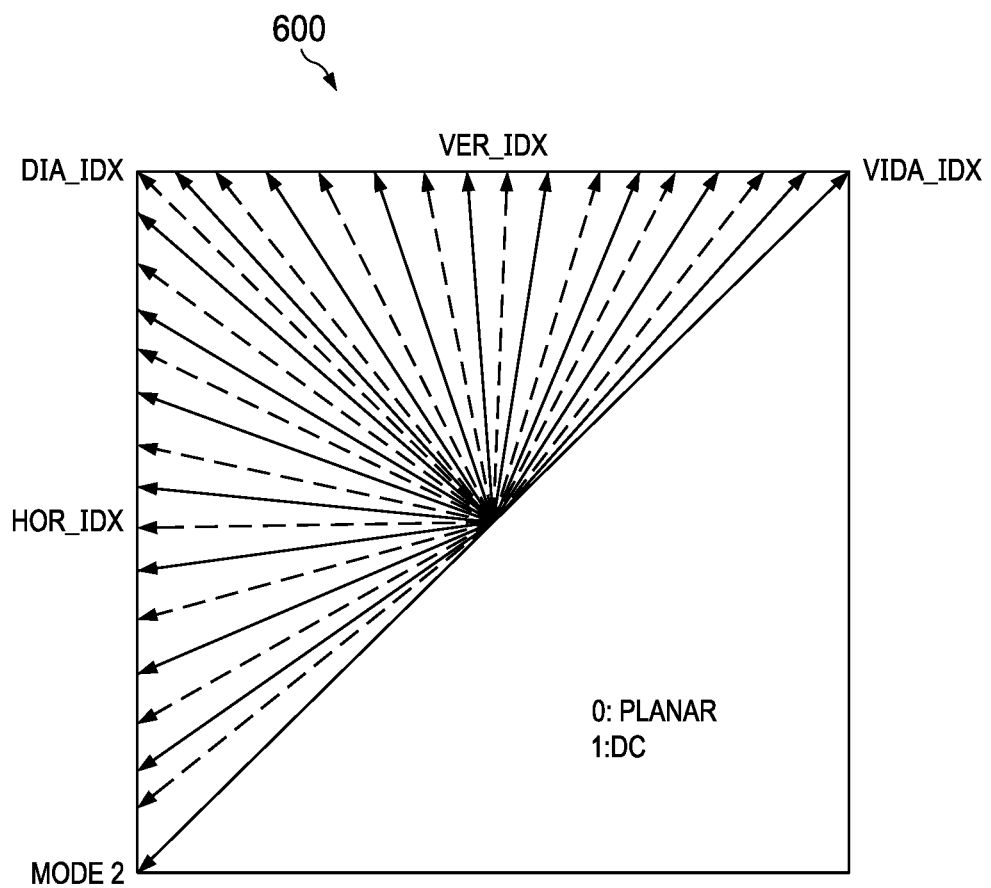
FIG. 6 is a schematic diagram of an example of 67 intra prediction modes.

Finally, if the MPM list is still not complete, the default modes are added in the order of: vertical, horizontal, intra mode 2, and diagonal mode. In FIG. 6 these modes are shown as HOR_IDX, DIA_IDX, MODE2 and VER_IDX, respectively. As a result of this process, a unique list of 6 MPM modes is generated.

For entropy coding of 6 MPMs, a truncated unary binarization of the MPMs is used. The first three bins are coded with contexts which depend on the MPM mode related to the bin currently being signaled. The MPM mode is classified into one of three categories: (a) whether the mode belongs to horizontal (MPM mode is less than or equal to a diagonal direction), (b) vertical (MPM mode greater than the diagonal direction), or (c) non-angular (DC and planar) class. Accordingly, three contexts are used to signal the MPM index.

The coding of the remaining 61 non-MPMs is done as follows. The 61 non-MPMs are firstly divided into two sets: a selected modes set and a non-selected modes set. The selected modes set contains 16 modes and the rest (45 modes) are assigned to the non-selected modes set. The mode set that the current mode belongs to is indicated in the bitstream with a flag. Then, the mode from the selected set is signaled with a 4-bit fixed-length code, and the mode from the non-selected set is coded with a truncated binary code. The selected modes set is generated by sub-sampling the total 61 non-MPM modes with indexes as follows:

Selected modes set={0, 4, 8, 12, 16, 20 . . . 60}
Non-selected modes set={1, 2, 3, 5, 6, 7, 9, 10 . . . 59}

The summary of the different INTRA mode signaling mechanisms is shown in Table 1.

TABLE 1

Current LUMA Intra mode signaling in BMS

| Intra prediction modes | MPM flag | Selected flag | Bin String |
|---|---|---|---|
| MPM (6) | 1 | | 0 |
| | | | 10 |
| | | | 110 |
| | | | 1110 |
| | | | 11110 |
| | | | 11111 |
| Selected modes (16) | 0 | 1 | 4 bits fixed length code |
| Non-selected modes (45) | 0 | 0 | Truncated binary code |

The present disclosure targets improvement in the intra mode signaling scheme.

Intra mode coding scheme currently described in BMS is considered complex and therefore a cleaner solution is desired.

A disadvantage of the selected modes set is that the index list is always constant and not adaptive based on the current block properties (for e.g. its neighboring blocks INTRA modes). A disadvantage of non-selected mode set is that the index list is always constant and not adaptive based on the current block properties (for e.g. its neighboring blocks INTRA modes).

In the present disclosure, an intra mode signaling scheme with 6 MPM and remaining 61 modes is proposed, wherein the remaining 61 modes are coded using a truncated binarization scheme. The most probable modes may also be referred to as most probable intra prediction modes, and the remaining modes may also be referred to as remaining intra prediction modes. Thus, embodiments may be configured to code all remaining intra modes, i.e. all intra modes that are not comprised in the MPM-list (in short "non-MPM modes") and are signaled in the bitstream, using truncated binarization. The remaining 61 intra modes can as well be coded using a fixed length code of 6 bits, but the disadvantage with the fixed length code of 6 bits is that out of the 64 possible codewords, only 61 codewords are used and 3 remaining code words are not used. Instead of a fixed length code, truncated binarization is proposed, which would use only 5 bits to signal the first 3 remaining modes and the remaining 58 modes are then coded using 6 bits. The 6 MPM modes are, e.g., coded using unary coding. Further embodiments may be configured to use an MPM-list and a remaining modes list with a different number of intra modes, e.g. an MPM list comprising more or less than 6 modes, and a remaining modes list comprising more or less than 61 modes. Embodiments may be in particular advantageous in case the number of remaining modes does not equal a power of two because fixed length coding would not use all possible code words efficiently. Embodiments using truncated binary coding may signal a few modes using less bits compared to the other modes of the remaining modes and thus signal the remaining modes more efficient.

Embodiments of an encoding method may comprise selecting an intra prediction mode for a current block; and encoding the intra prediction mode using truncated binary coding when the selected intra prediction mode is a remaining mode. The remaining mode may be comprised in or be part of a set or plurality of remaining modes, e.g. a remaining mode list. Embodiments may further comprise determining that the intra prediction mode is not comprised in (or is outside) an MPM list, and encoding the selected intra prediction mode using truncated binary coding. In embodiments, the selected intra prediction mode is not comprised in (or is outside of) an MPM list. Embodiments may comprise an MPM list and the remaining modes, e.g. only the MPM list and the remaining modes (non-MPM modes) and do not distinguish further sets of intra-prediction modes for coding or signaling, wherein none of the intra prediction modes of the remaining modes is comprised in the MPM list. In embodiments, the MPM list may comprise 6 intra prediction modes and the remaining modes may comprise 61 modes. Embodiments may comprise adding the truncated binary code to a bitstream. Further embodiments comprise an encoder, e.g. an encoding apparatus or device, configured to perform any of the encoding methods.

Embodiments of a decoding method may comprise obtaining an truncated binary code, e.g. by parsing a bitstream or by other means; decoding the truncated binary code to obtain an intra prediction mode of a remaining mode, e.g. from a plurality or set of remaining modes; and generating a current block using the intra prediction mode that was obtained. The further features described with regard to the encoding method equally or correspondingly apply to the respective decoding embodiments. Further embodiments comprise a decoder, e.g. a decoding apparatus or device, configured to perform any of the decoding methods.

Several solutions are proposed to fill the first three modes of the remaining modes list.

The first three modes in the remaining modes list can be filled in several possible ways.

First, by using the modes from a predetermined default mode list which is {planar mode (PLANAR_IDX, which corresponds to index "0"), dc mode (DC_IDX, which corresponds to index "1"), vertical mode (VER_IDX), horizontal mode (HOR_IDX), intra mode 2 (MODE2, which corresponds to index "2"), vertical diagonal mode (VDIA_IDX), and diagonal mode (DIA_IDX)} (the terms in the brackets show the corresponding terms in FIG. 6, further details about FIG. 6 are provided below, the default mode list only comprises intra-prediction modes and may also be referred to as default intra prediction mode list).

Second, by using offsets to the angular modes (angular intra-prediction modes) which are already present in the MPM list. Here, the offset can be +/−N, where N is a possible integer value whose value is {1, 2, 3, 4}. The offsets could be added only to the first two angular modes from the MPM list.

Figure 5:
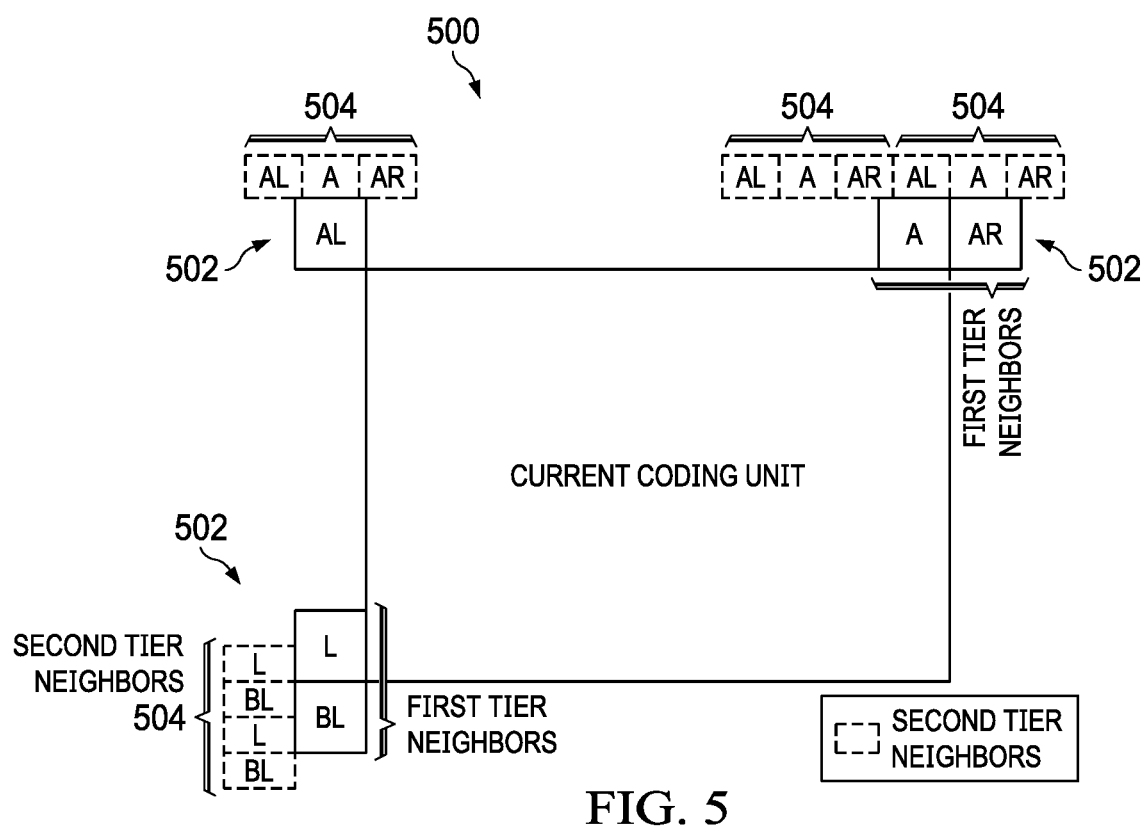
FIG. 5 is a schematic diagram of a current coding unit, first tier neighbors, and second tier neighbors.

Third, the intra modes (angular intra-prediction modes) of non-adjacent neighbors can also be used to fill the three modes. FIG. 5 depicts a current coding unit 500, first tier neighbors 502, and second tier neighbors 504. As shown in FIG. 5, second tier neighbors intra modes can used.

Fourth, as shown in FIG. 6, in a first step, a given mode from an MPM list is taken and is checked if it is "nearby" to one of the following mode categories {DC_IDX, HOR_IDX, DIA_IDX, VER_IDX, VDIA_IDX}, in a second step, the mode categories are then "sorted" based on the "majority" of modes which are close to it. In a third step, the remaining modes list is generated by inserting modes which are nearby to the winning mode category from step 2.

FIG. 6 shows an example of 67 intra prediction modes, e.g., as proposed for VVC, the plurality of intra prediction modes of 67 intra prediction modes comprising: planar mode (index 0), dc mode (index 1), and angular modes with indices 2 to 66, wherein the left bottom angular mode in FIG. 3 refers to index 2 and the numbering of the indices being incremented until index 66 being the top right most angular mode of FIG. 6.

The processing circuitry can be implemented in hardware, or in a combination of hardware and software, for example by a software programmable processor or the like.

Figure 7:
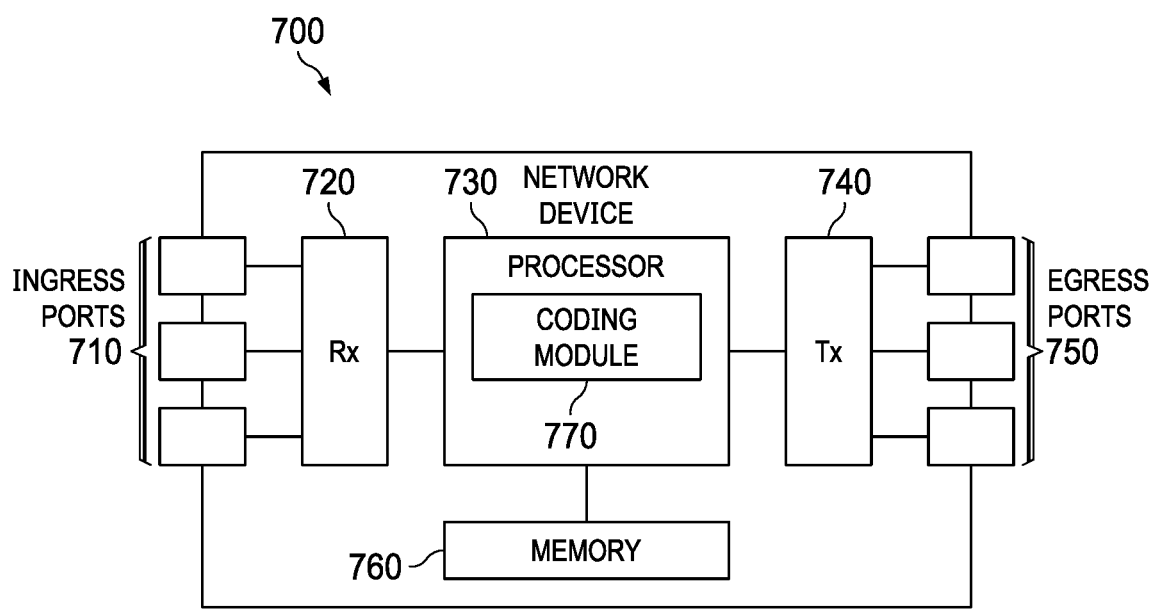
FIG. 7 is a schematic diagram of an example video coding device.
Figure 6:
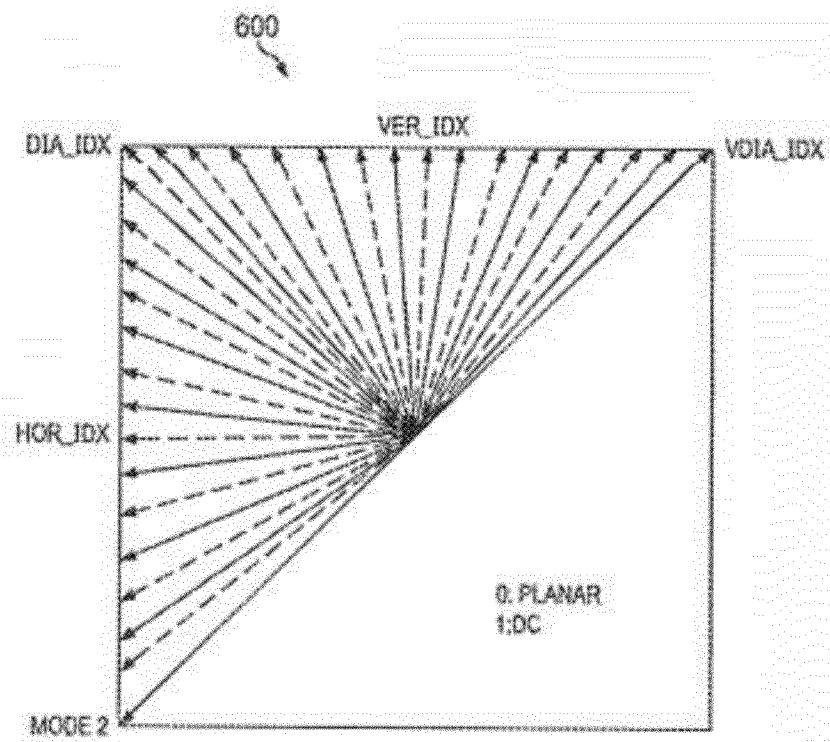

FIG. 7 is a schematic diagram of a network device 700 according to an embodiment of the disclosure. The network device 700 is suitable for implementing the disclosed embodiments as described herein. The network device 700 comprises ingress ports 710 and receiver units (Rx) 720 for receiving data; a processor, logic unit, or central processing unit (CPU) 730 to process the data; transmitter units (Tx) 740 and egress ports 750 for transmitting the data; and a memory 760 for storing the data. The network device 700 may also comprise optical-to-electrical (OE) components and electrical-to-optical (EO) components coupled to the ingress ports 710, the receiver units 720, the transmitter units 740, and the egress ports 750 for egress or ingress of optical or electrical signals.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the ingress ports 710, receiver units 720, transmitter units 740, egress ports 750, and memory 760. The processor 730 comprises a coding module 770. The coding module 770 implements the disclosed embodiments described above. For instance, the coding module 770 implements, processes, prepares, or provides the various networking functions. The inclusion of the coding module 770 therefore provides a substantial improvement to the functionality of the network device 700 and effects a transformation of the network device 700 to a different state. Alternatively, the coding module 770 is implemented as instructions stored in the memory 760 and executed by the processor 730.

The memory 760 comprises one or more disks, tape drives, and solid-state drives and may be used as an overflow data storage device, to store programs when such programs are selected for execution, and to store instructions and data that are read during program execution. The memory 760 may be volatile and/or non-volatile and may be read-only memory (ROM), random access memory (RAM), ternary content-addressable memory (TCAM), and/or static random-access memory (SRAM).

Additional details of this disclosure are presented in the following embodiments.

Embodiment 1. An apparatus for determining an adopted intra prediction mode on the basis of a most probable modes (MPM) list and a remaining modes list having a first portion and a second portion, wherein the adopted intra prediction mode is one of a plurality of intra prediction modes comprising a plurality of angular intra prediction modes for predicting sample values of a current picture block, wherein the apparatus comprises a processing circuitry configured to: generate the first portion of the remaining modes list by including one or more angular intra prediction modes determined on the basis of the most probable modes list such that the one or more angular intra prediction modes of the first portion of the remaining modes list are close to a respective angular intra prediction mode of the most probable modes list; and determine the adopted intra prediction mode, in case the adopted intra prediction mode is part of the first portion of the remaining modes list, using less bits for encoding or decoding the adopted intra prediction mode than in case the adopted intra prediction mode is part of the second portion of the remaining modes list.

Embodiment 2. The apparatus of embodiment 1, wherein the processing circuitry is configured to generate the first portion of the remaining modes list by: ranking a plurality of angular intra prediction mode categories according to the number and/or the direction of angular intra prediction modes of the most probable modes list falling within each angular intra prediction mode category; and generating a first portion of the remaining modes list by including one or more angular intra prediction modes from the highest ranked angular intra prediction mode category in the remaining modes list.

Embodiment 3. The apparatus of embodiment 2, wherein the first portion of the remaining modes list obtained from a predetermined default mode list comprising five angular intra prediction mode categories, namely dc mode (DC_IDX), vertical mode (VER_IDX), horizontal mode (HOR_IDX), intra mode 2 (2), vertical diagonal mode (VDIA_IDX) and diagonal mode DIA_IDX, wherein an angular intra prediction mode of the most probable modes list falling within each angular intra prediction mode category, for example, corresponds to associating each of the angular intra prediction modes of the most probable modes list to the angular intra prediction mode category being closest to the corresponding angular intra prediction mode of the most probable modes list.

Embodiment 4. The apparatus of embodiment 2 or 3, wherein the processing circuitry is further configured to complete the first portion of the remaining modes list by repeating step (ii) with the second highest ranked angular intra prediction mode category.

Embodiment 5. The apparatus of embodiment 2 to 3, wherein each intra prediction mode is identified by an intra prediction mode index and wherein the processing circuitry is configured to define the plurality of angular intra prediction mode categories on the basis of the respective angular intra prediction modes associated with a horizontal direction, a vertical direction and one or more diagonal directions.

Embodiment 6. The apparatus of any one of the preceding embodiments, wherein each intra prediction mode is identified by an intra prediction mode index and wherein the processing circuitry is configured to generate the first portion of the remaining modes list by including one or more angular intra prediction modes in the first portion of the remaining modes list, whose respective intra prediction mode index has an offset of +1, −1, +2, −2, +3, −3, +4 or −4 with respect to an intra prediction mode index of an angular intra prediction mode of the most probable modes list.

Embodiment 7. The apparatus of embodiment 6, wherein each list element of the most probable modes list is identified by a most probable modes index and wherein the processing circuitry is configured to generate the first portion of the remaining modes list by including one or more angular intra prediction modes in the first portion of the remaining modes list, whose respective intra prediction mode index has an offset of +1, −1, +2, −2, +3, −3, +4 or −4 with respect to an intra prediction mode index of an angular intra prediction mode of the most probable modes list.

Embodiment 8. The apparatus of embodiment 7, wherein the processing circuitry is configured to generate the first portion of the remaining modes list by including one or more angular intra prediction modes in the first portion of the remaining modes list on the basis of a processing loop starting with the offset of +1 with respect to an intra prediction mode index of an angular intra prediction mode of the most probable modes list, which is incremented during each round of the processing loop, or with the offset of −1 with respect to an intra prediction mode index of an angular intra prediction mode of the most probable modes list, which is decremented during each round of the processing loop.

Embodiment 9. The apparatus of embodiment 8, wherein the processing circuitry is configured to repeat the processing loop for an angular intra prediction mode of the most probable modes list having a small most probable modes index more often than the processing loop for an angular intra prediction mode of the most probable modes list having a large most probable modes index.

Embodiment 10. The apparatus of embodiment 8, wherein the processing circuitry is configured to generate the first portion of the remaining modes list by including one or more angular intra prediction modes in the first portion of the remaining modes list, whose respective intra prediction mode index has an offset of +2, −2, +4, −4, +6, −6, +8 or −8 with respect to an intra prediction mode index of an angular intra prediction mode of the most probable modes list.

Embodiment 11. The apparatus of any one of the preceding embodiments, wherein the processing circuitry is further configured to generate the second portion of the remaining modes list by including those intra prediction modes of the plurality of intra prediction modes in the second portion of the remaining modes list that are not part of the most probable modes list and the first portion of the remaining modes list.

Embodiment 12. The apparatus of any one of the preceding embodiments, wherein the processing circuitry is further configured to be implemented in hardware, or in a combination of hardware and software.

Embodiment 13. The apparatus of any one of the preceding embodiments, wherein the processing circuitry is further configured to predict sample values of the current picture block using the adopted intra prediction mode and to provide a predicted picture block.

Embodiment 14. The apparatus according to embodiment 13, wherein the apparatus is an encoding apparatus, and wherein the processing circuitry is further configured to: encode the current picture block on the basis of the predicted picture block and the adopted intra prediction mode.

Embodiment 15. The apparatus according to embodiment 14, wherein the processing circuitry is further configured to signal a truncated binary code for an intra prediction mode of the current picture block if the intra prediction mode belongs to the remaining modes list.

Embodiment 16. The apparatus according to embodiment 15, wherein the apparatus is a decoding apparatus, and wherein the processing circuitry is further configured to decode the current picture block on the basis of the predicted picture block and the adopted intra prediction mode.

Embodiment 17. The apparatus according to embodiment 16, wherein the processing circuitry is further configured to parse a truncated binary code to determine an intra prediction mode of the current picture block if the intra prediction mode belongs to the remaining modes list.

Embodiment 18. A method for determining an adopted intra prediction mode on the basis of a most probable modes list and a remaining modes list having a first portion and a second portion, wherein the adopted intra prediction mode is one of a plurality of intra prediction modes comprising a plurality of angular intra prediction modes for predicting sample values of a current picture block, wherein the method comprises: generating the first portion of the remaining modes list by including one or more angular intra prediction modes determined on the basis of the most probable modes list such that the one or more angular intra prediction modes of the first portion of the remaining modes list are close to a respective angular intra prediction mode of the most probable modes list; and determining the adopted intra prediction mode, in case the adopted intra prediction mode is part of the first portion of the remaining modes list, using less bits, for encoding or decoding the adopted intra prediction mode, than in case the adopted intra prediction mode is part of the second portion of the remaining modes list.

Embodiment 19. A computer program product comprising program code for performing the method of embodiment 14 when executed on a computer or a processor.

Embodiment 20. The apparatus according to any one of the embodiments 1 to 13, wherein the processing circuitry is further configured to determine the first portion of the remaining modes list from a predetermined default mode list comprising or consisting of a planar mode (PLANAR_IDX), a dc mode (DC_IDX), a vertical mode (VER_IDX), an horizontal mode (HOR_IDX), an intra mode 2 (2), a vertical diagonal mode (VDIA_IDX), and a diagonal mode (DIA_IDX).

Embodiment 21. The apparatus according to any one of the embodiments 1 to 13, wherein the processing circuitry is further configured to determine the first portion of the remaining modes list by including the intra prediction modes of second tier neighbors of the current picture block.

Embodiment 22. At both encoder and decoder, the intra mode is signaled by using truncated binarization for the non-MPM intra modes.

Embodiment 23. Since truncated binarization is used for coding 61 non-MPMs, the first three modes will require 5 bits to be signaled and therefore the first three modes in non-MPMs list are generated based on the intra modes which are already included in the MPM list.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A non-transitory computer-readable recording medium storing a bitstream that, when parsed by a coding device, is used by the coding device to generate a picture, the bitstream comprising an encoded intra prediction mode for a block, wherein intra prediction modes either belong to a most probable modes (MPM) list or to remaining modes, wherein 6 modes are in the MPM list and 61 modes are in the remaining modes, and when the intra prediction mode is a remaining mode, the intra prediction mode is encoded using truncated binary coding, wherein the intra prediction mode is encoded using 5 bits when the intra prediction mode is one of a first three modes from the remaining modes, and the intra prediction mode is encoded using 6 bits when the intra prediction mode is outside a first three modes from the remaining modes.

2. The non-transitory computer-readable recording medium of claim 1, wherein initial modes in a remaining modes list are from a predetermined default mode list.

3. The non-transitory computer-readable_recording medium of claim 2, wherein the predetermined default mode list comprises a planar mode (PLANAR_IDX), a do mode (DC_IDX), a vertical mode (VER_IDX), a horizontal mode (HOR_IDX), an intra mode 2 (2), a vertical diagonal mode (VDIA_IDX), and a diagonal mode (DIA_IDX).

4. The non-transitory computer-readable recording medium of claim 3, wherein initial modes in the remaining modes list have an offset to angular modes included in the MPM list.

5. The non-transitory computer-readable recording medium of claim 4, wherein the offset is +/−N, where N is an integer with a value of 1, 2, 3, or 4.

6. The non-transitory computer-readable recording medium of claim 4, wherein the offset is added only to a first of two of the angular modes in the MPM list.

7. The non-transitory computer-readable recording medium of claim 1, wherein initial modes of the remaining mode list comprise modes of neighboring blocks not immediately adjacent to the current block.

8. The non-transitory computer-readable_recording medium of claim 1, wherein initial modes of the remaining modes list comprise modes of second tier neighbors of the current block instead of first tier neighbors.

* * * * *

UNITED STATES PATENT AND TRADEMARK OFFICE
CERTIFICATE OF CORRECTION

PATENT NO. : 12,184,842 B2
APPLICATION NO. : 18/322404
DATED : December 31, 2024
INVENTOR(S) : Anand Meher Kotra et al.

It is certified that error appears in the above-identified patent and that said Letters Patent is hereby corrected as shown below:

In the Drawings

Drawing sheet 4 of 4, FIG. 6, should be replaced with the FIG. 6 shown on the attached drawing sheet.

In the Claims

Column 21, Claim 3, Lines 20-22, through Column 22, Lines 1-3, should read:
3. The non-transitory computer-readable recording medium of claim 2, wherein the predetermined default mode list comprises a planar mode (PLANAR_IDX), a dc mode (DC_IDX), a vertical mode (VER_IDX), a horizontal mode (HOR_IDX), an intra mode 2 (2), a vertical diagonal mode (VDIA_IDX), and a diagonal mode (DIA_IDX).

Column 22, Claim 8, Lines 18-21, should read:
8. The non-transitory computer-readable recording medium of claim 1, wherein initial modes of the remaining modes list comprise modes of second tier neighbors of the current block instead of first tier neighbors.

Signed and Sealed this
Twenty-seventh Day of May, 2025

Coke Morgan Stewart
*Acting Director of the United States Patent and Trademark Office*